United States Patent [19]

Donahoo

[11] Patent Number: 5,528,432
[45] Date of Patent: Jun. 18, 1996

[54] INTRA-ORAL OPTICAL VIEWING DEVICE

[75] Inventor: Randy Donahoo, Tuttle, Okla.

[73] Assignee: Ultrak, Inc., Carrollton, Tex.

[21] Appl. No.: 200,648

[22] Filed: Feb. 23, 1994

[51] Int. Cl.⁶ .................................................. G02B 5/00
[52] U.S. Cl. ........................ 359/894; 359/823; 359/425; 348/66
[58] Field of Search .................................. 359/894, 895, 359/822, 823, 826, 828, 421, 422, 425, 426; 348/66, 340; 128/6

[56] References Cited

U.S. PATENT DOCUMENTS

| | | | |
|---|---|---|---|
| 3,529,882 | 9/1970 | Schmidt | 359/421 |
| 4,017,148 | 4/1977 | Taylor | 359/421 |
| 4,215,678 | 8/1980 | Heine et al. | 359/894 |
| 4,722,000 | 1/1988 | Chatenever | 359/422 |
| 4,807,594 | 2/1989 | Chatenever | 359/894 |
| 4,858,001 | 8/1989 | Milbank et al. | 348/66 |
| 5,016,098 | 5/1991 | Cooper et al. | 348/66 |
| 5,051,823 | 9/1991 | Cooper et al. | 348/66 |
| 5,115,307 | 5/1992 | Cooper et al. | 348/66 |
| 5,124,797 | 6/1992 | Williams et al. | 348/340 |

*Primary Examiner*—Loha Ben
*Attorney, Agent, or Firm*—Jenkens & Gilchrist

[57] ABSTRACT

An electronic optical viewing wand capable of viewing an object in a confined space, such as a dental patient's mouth, using only ambient light. The wand can be held and the focused in one hand via a telescoping/sliding focusing casing. The focal distance is adjustable from about 5 mm to infinity without having to change lenses.

25 Claims, 3 Drawing Sheets

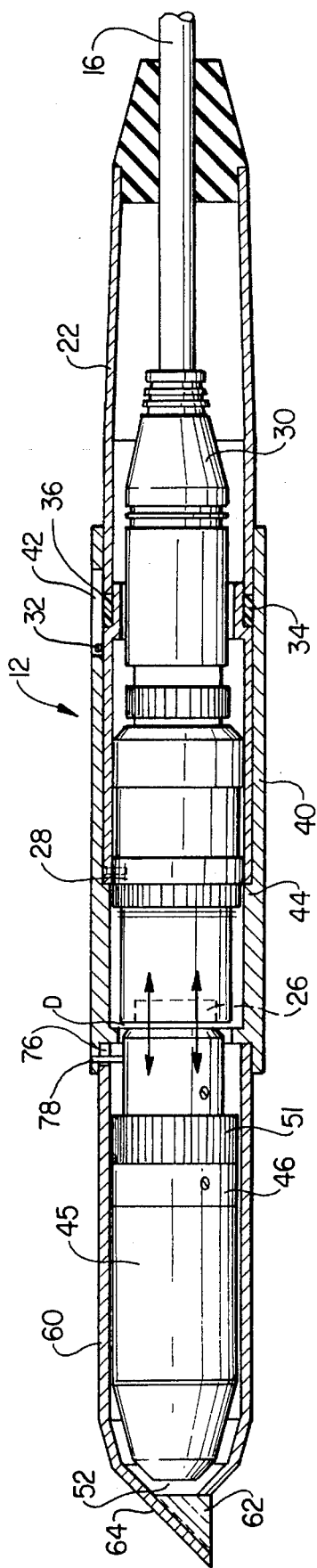
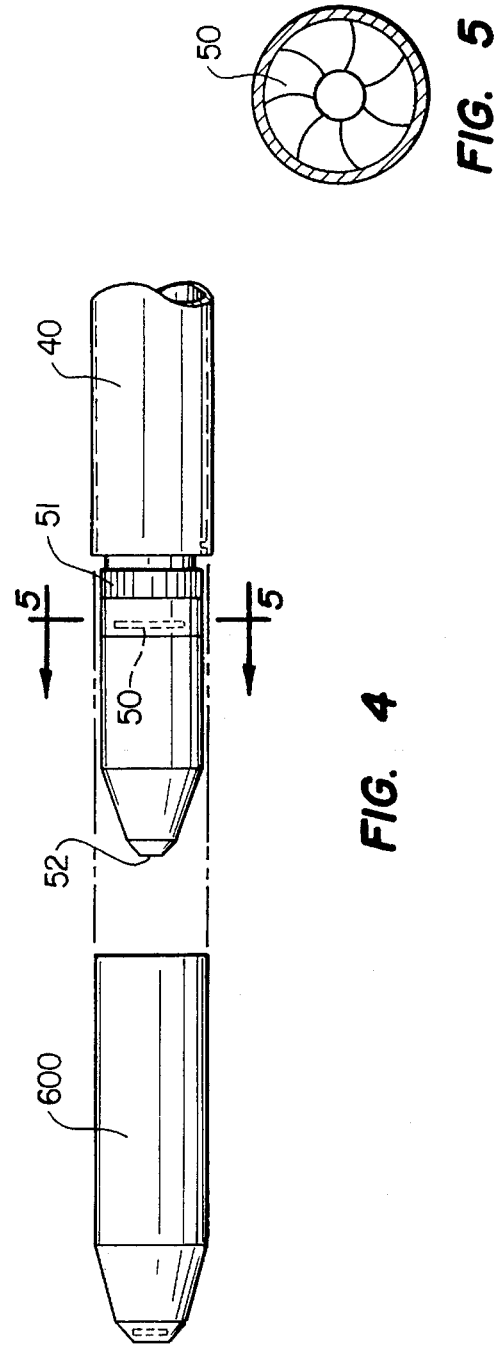
FIG. 3
FIG. 4
FIG. 5

INTRA-ORAL OPTICAL VIEWING DEVICE

BACKGROUND OF THE INVENTION

1. Field of the Invention

This invention relates to intra-oral viewing systems. In particular, this invention relates to intra-oral camera systems for viewing teeth, gums and the like inside a patient's mouth in ambient light. Furthermore, this invention relates to intra-oral viewing systems that have an adjustable focal length from 5 mm to infinity.

2. Description of the Prior Art

In recent years, dentists and oral physicians have begun to include intra-oral cameras in their practice. Intra-oral cameras enable a dentist to view portions of a patient's mouth on a video monitor. The intra-oral camera is placed within a patient's mouth and aimed at an object of interest. An image of the object is transmitted from the intra-oral camera to a video monitor. The image, such as a tooth, can be carefully viewed on the monitor by both the dentist and the patient. Such a system allows a dentist or physician to better provide an accurate prognosis and also allows a patient to be better informed of a medical condition by the dentist or physician.

U.S. Pat. No. 5,115,307, issued May 19, 1992, to Cooper et al., discloses an electronic video dental camera which requires lens prescription attachments for changing the magnification, field of view and focal length of the video dental camera. Although it is advantageous to make optical prescription changes, Cooper '307 requires that the video camera be removed from the patient's mouth while a different lens prescriptions are snapped onto the tip of the camera. Thus, instantaneous focus and field of view changes are not possible.

U.S. Pat. No. 4,858,001, issued Aug. 15, 1989, to Milbank et al., discloses an endoscope which is fully immersible in liquid media. The endoscope is capable of presenting an image for real-time viewing or recording a playback at a later time. This disclosed invention is not specifically designed for intra-oral examination and is not capable of changing the focal length, field of view and magnitude of zoom. Milbank '001 is based on a fiber optic system which limits the focal abilities of the camera.

U.S. Pat. No. 5,124,797, issued Jun. 23, 1992, to Williams et al., discloses a micro video imaging camera. The micro video camera has an internal lens system, but the focal length, field of view and/or zoom of the lens can not be changed after the apparatus is constructed as disclosed.

U.S. Pat. No. 5,051,823, issued Sep. 24, 1991, to Cooper et al., discloses a dental instrument having both a laser and an electronic video dental camera. The camera uses a charged coupled device (CCD) and is located at the distal end of the dental instrument. There is a slide switch on the outside of the camera casing for manipulating the angular position of a flexible light probe. The camera's focal length is not adjustable due to the use of a fixed position focal lens. Furthermore, the distal end of the Cooper '823 apparatus is large, bulky and possibly difficult to maneuver easily inside a patient's mouth.

U.S. Pat. No. 5,016,098, issued May 14, 1991, to Cooper et al., discloses an electronic video dental camera for viewing the inside of a patient's mouth. The apparatus' distal end has interchangeable attachments which change the optical characteristics of the camera. For example, the interchangeable attachments include a telephoto lens, wide angle lens, relay lens, and various translumination devices. The attachments can only be changed when the device is not in use and therefore requires the doctor to remove the camera from the patient's mouth, change the lens, then replace the camera in the patient's mouth and relocate the object of interest.

All the above described oral cameras are disadvantageous for a variety of reasons. First, none of the disclosed apparatus allow a dentist or physician to vary the focal length of the camera without physically changing a lens. Furthermore, the related art generally requires an additional light source, other than ambient light in order to produce a clear picture.

SUMMARY OF THE INVENTION

It is an object of the present invention to provide an intra-oral video camera which is capable of operating and producing a quality picture using only ambient light.

It is a further object of the present invention to provide an intra-oral video camera having an adjustable focal length. The focus is adjustable via a sliding/telescoping mechanism on the outside of the intra-oral device so that the device can be positioned and focused within a patient's mouth with one hand.

It is a further object of the present invention to provide an intra-oral video camera system which can zoom and magnify a focused image.

These objects and others are achieved by providing an intra-oral video viewing system having a lens system inside a dental wand. The lens system receives ambient light reflected from an object to be viewed. The lens system has a movable portion which changes the focal length of the optical system from infinity to about 5 mm.

An image of a viewed object is projected onto a charged coupled device (CCD) and transformed into a video signal. The video signal is processed for viewing on a video monitor. The image can be magnified electronically within the video circuitry. The lens system is linked to a movable portion which is slidably attached to the outside of the dental wand so that a physician or dentist can adjust the focal length of the camera while holding the wand with one hand.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which:

FIG. 3 is a cross-sectional view of the present invention with only the housing sectioned;

FIG. 4 is an elevational view of a second embodiment of the present invention;

FIG. 5 is a cross-sectional view of the intra-oral dental wand taken along the 5—5 line of FIG. 4.

DESCRIPTION OF THE PRESENTLY PREFERRED EXEMPLARY EMBODIMENTS

Figure 1:
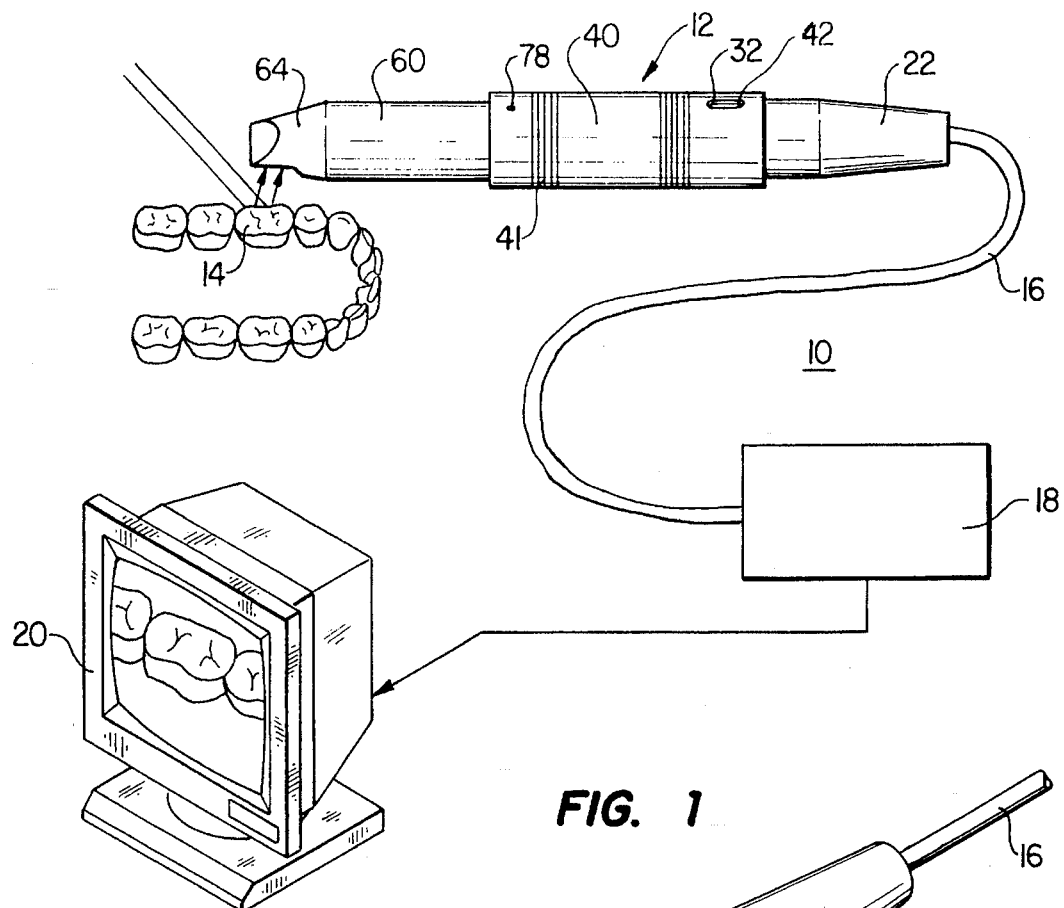
FIG. 1 depicts a diagram of an embodiment of the intra-oral viewing system.
Figure 2:
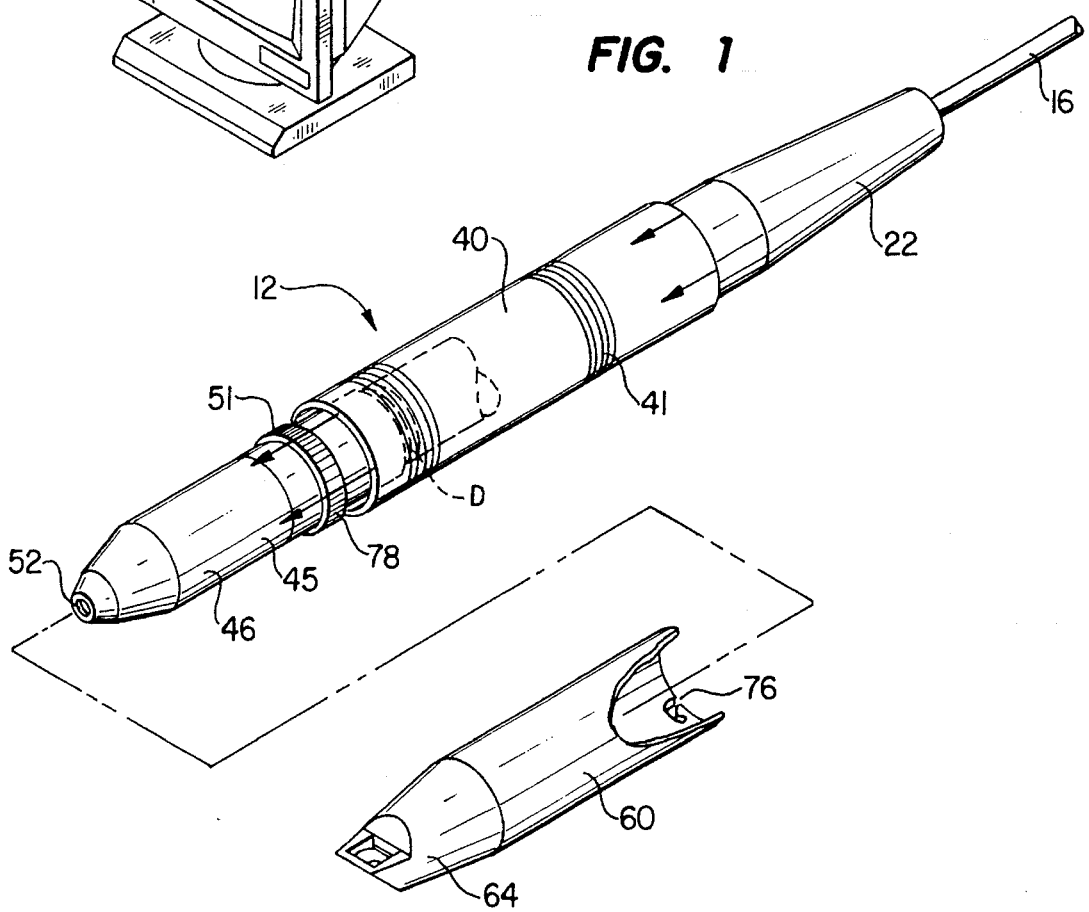
FIG. 2 is an isometric view of an embodiment of the i intra-oral dental wand.

FIGS. 1, 2 and 3 illustrate details of a first exemplary embodiment of the intra-oral video viewing system 10. The dental wand 12, which is described in more detail below, is aimed at an object of interest, such as a tooth 14. No extra lighting, beyond ambient light, is required. Ambient light is reflected from the tooth 14 or object and is received by the dental wand 12. The dental wand changes the object's reflection into a signal representing the object's image and sends the signal to the video processor 18 via cable 16.

The video processor 18 receives the image signals from the wand 12 and processes them into a video signal. The video processor 18 can enlarge and magnify the image so that points of interest on the image can be closely studied by the dentist or physician. The video signal of the image is sent to the video monitor 20 so that the image can be viewed by the dentist and/or the patient.

In the preferred embodiment, the image is in color and can be enlarged, magnified, rotated, stored and recorded. The monitor screen, in combination with the video processor 18, can produce split screen views of presently and previously viewed objects. The viewing of an object can be freeze framed on the monitor so that the image on the monitor can be carefully studied without the dentist having to hold the dental wand 12 steady inside the patient's mouth.

The dental wand 12 of the preferred embodiment is shaped for easy insertion and manipulation within a patient's mouth. Shapes include, but are not limited to, cylindrical with tapered or rounded ends, cigar shaped or a tubularly elongated shape having a cross-sectional shape being circular, oval, octagonal, triangular or any shape that would be considered easy for a human to hold and easy to manipulate in a patient's mouth. It is noted that the shape may be irregular and conform to the shape of a human hand when holding and operating the dental wand 12.

The wand 12 comprises a variety of components. Referring to FIGS. 2 and 3, at the proximal end of the wand 12 is a stationary casing 22 wherein the cable 16 enters the wand 12, preferably via a rubber grommet. The stationary casing is constructed of stainless steel, but can be any other material suitably equivalent, such as aluminum, glass, pyrex, plastic, etc. The stationary casing 22 should be made of a material that can be sanitized using a well known medical method.

A charged coupled device (CCD) 26 is mounted within the stationary casing 22 so that the light receiving side of the CCD 26 is directed toward the distal end of the wand 12. The cable 16 connects to the proximal end of the CCD 26. In the preferred embodiment, the CCD 26 is combined with a CCD focusing means 28 which may be preadjusted and locked into place. The CCD focusing means 28, via mechanical manipulation, electrically focuses the color and overall quality of the CCD image output to cable 16. In the preferred embodiment, a Panasonic, part No. GP-KS152 is used for the CCD 26 and CCD focusing means 28. It is understood that a variety of CCD light receiving devices could be mounted within the present inventions's stationary casing.

The stationary casing 22 has a movement guide 32 which can be a screw, knob, tab, or any other durable protrusion. The movement guide 32 is movably engaged within movement slot 42 and is described in more detail below.

The preferred embodiment also includes an annular groove 34 about the stationary casing 22 for holding a washer 36 as an interposed element between the stationary casing 22 and a focusing casing 40. The washer 36 can be made of a suitable polymer material, such as plastic, so that it both smoothes the movement between the focusing casing 40 and the stationary casing 22, and keeps dust, dirt and other foreign particles out of the interior of the wand 12.

As alluded to above and shown in FIG. 3, the focusing casing 40 and the stationary casing are concentrically positioned with the stationary casing being slidably fitted within the focusing casing. This configuration places the overlapping end of the focusing casing 40 facing the proximal end of the wand 12 so that fluids and other debris originating from in and around a patient's mouth are less able to enter the wand when the intra-oral video viewing system 10 is in use.

A movement stopper 44 is located within the distal portion of the focusing casing 40. The combination of the movement guide 32, the movement slot 42 and the movement stopper 44 provide a means for slidably moving the focusing casing 40 to positions longitudinally along the stationary casing 22. The sliding of the focusing casing 40 with respect to the stationary casing 22 varies the distance D between a lens means 45, described below, the CCD 26 thereby changing the overall focal distance of the present invention. It is understood that there could be a plurality of movement guides 32 and slots 42 located radially and/or linearly from each other about the wand 12 for controlling the wand's focusing. It is also understood that the movement stopper 44 can be a variety of shapes and configurations. In the preferred embodiment the movement stopper 44 is a cylindrical ring positioned concentrically within the distal portion of the focusing casing 40.

On the outside surface of the focusing casing is a gripping means 41 which increases the friction between a user's hand and the wand 12. The gripping means can have a variety configurations including annular grooves, bumps, indentions or other equivalent configurations. The gripping means 41 is preferably integral to the focusing casing 40 so that no extra parts are required and so that the wand can be sanitized easily. The gripping means 41 could also be a separately attached piece that is, for example, squeeze fitted, welded, or glued to the outside of the focusing casing 40.

Figure 6:
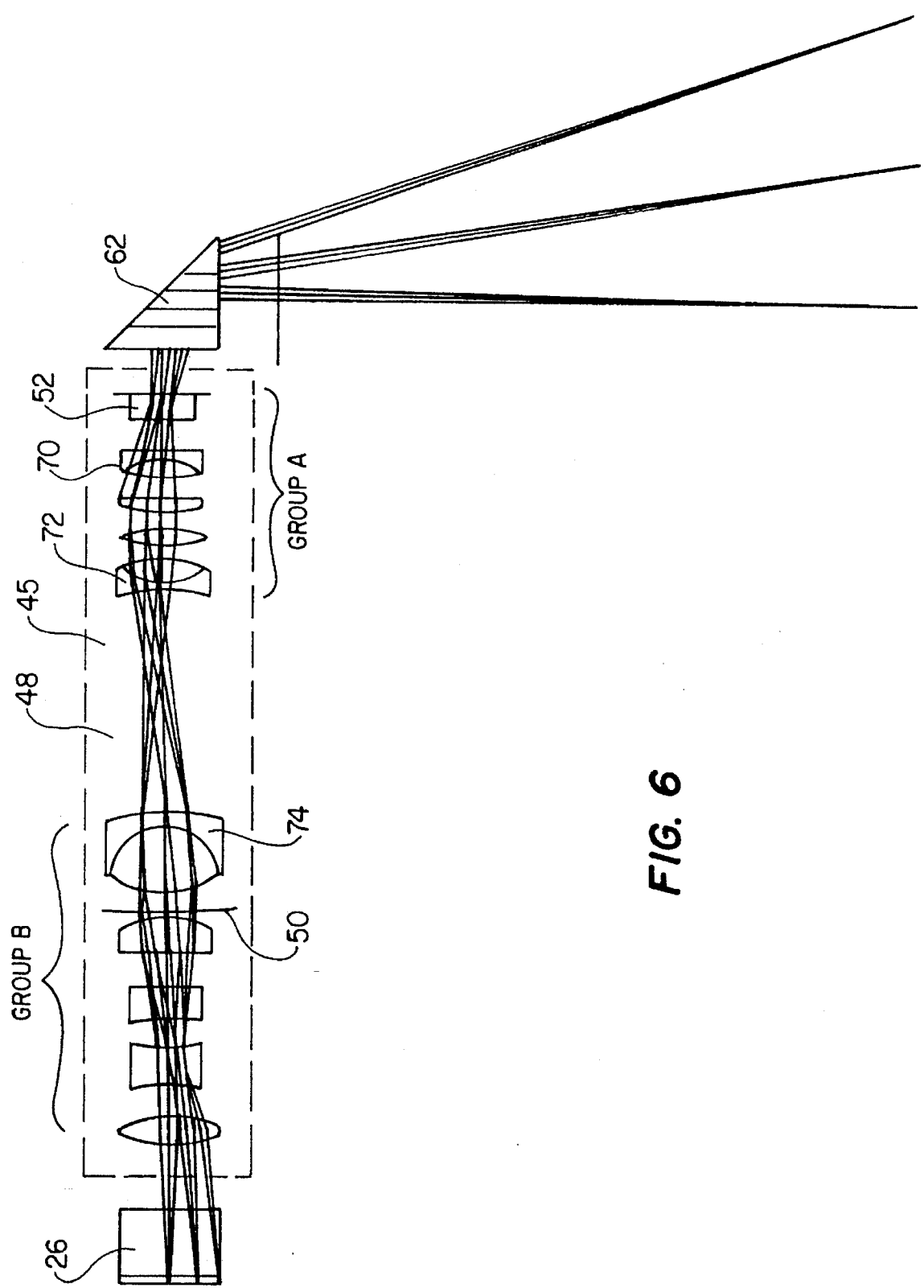
FIG. 6 is a diagram of a lens configuration in the preferred embodiment of the present invention.

At the distal end of the focusing casing 40 is a lens means 45. The lens means 45 moves, in conjunction with the movement of the focusing casing 40, relative to the stationary casing 22 to direct and focus the image of an object onto the CCD 26. Preferably, the lens means comprises a pinhole lens 52 at the distal end of the lens means 45. The lens means 45, of the preferred embodiment, has a plurality of lenses 48, a limiting aperture 50 and a pinhole lens 52 preferably all within a lens casing 46. The plurality of lenses 48 are placed between the pinhole lens and the proximal end of the lens means as shown in FIG. 6.

The pinhole lens 52 is the first optical element image light encounters prior to an achromat or surface 70. All on-axis and off-axis rays enter the pinhole lens 52 coincidentally and then begin to fan out through the subsequent lenses. A first group A of optics comprising two achromats and three singlets form an intermediate image close to the second achromat 72. The intermediate image is inverted. A second group B of optics relay the image to the CCD 26 and magnify it approximately two times. A limiting aperture or iris diaphragm 50 is preferably positioned after the third achromat 74. The limiting aperture 50 controls the light gathering power of the system. An aperture adjustment wheel 51 is depicted in FIG. 2.

The preferred embodiment's lens means 45 corrects all primary aberrations and is reasonably small in diameter so that it can fit within the dental wand 12. The preferred embodiment utilized a Panasonic GP-LP12T pinhole lens.

The focal distance of the CCD 26 and lens means 45 combination is changed via the sliding movement of the focusing casing 40. The focal distance of the intra-oral viewing system 10 can be adjusted from about 5 millimeters to infinity. This configuration allows a dentist to focus on the patient's face and record the patient's identification prior to viewing the interior of the patient's mouth.

FIG. 2 depicts a first embodiment of a distal casing 60 which is detachably engaged to the distal portion of the focusing casing 40. The distal casing 60 has a bayonet slot 76 for removably attaching the distal casing 60 to the bayonet pin 78 associated with the distal end of the focusing casing 40. A plurality of bayonet mounts could be used or any comparable attaching means, such as a screw mount, pin mount, annular ring mount, etc., to removably attach the distal casing 60. At the distal end of the distal casing 60, a prism 62 is mounted to direct light reflected from an object of interest positioned radially from a longitudinal axis of the wand 12 toward the pinhole lens 52. Thus, a dentist can view a patient's tooth with the distal end of wand 12 positioned centrally within a patient's mouth.

Furthermore, the lens means 45 in combination with the focusing casing 40 and CCD 26 allow a dentist to view the interior of a patient's mouth without a special light source other than ambient light. The present preferred embodiment provides a more true to life picture by only requiring ambient light, than other similar systems that require an additional light source. That is, with additional lighting from, for example, a fiber optic light source inside a patient's mouth, problems of glare, blooming, wash out, loss of color and loss of detail definition result. With the present invention, because there is no additional light source, these problems are eliminated and the result is a clearer color picture.

A second embodiment of the present invention depicted in FIG. 3 comprises a distal casing having a window for viewing objects linearly distal from the distal end of the wand 12.

The distal casings 60, and 600 (FIGS. 2 and 4) are preferably made of stainless steel or another equivalent material. The distal casings 60, 600 can be sanitized in a variety of ways which include the use of an autoclave, heat source, ultraviolet source, radiation source or cleaning/disinfecting solutions.

The present invention, when used in an intra-oral situation allows a dentist to focus on an object of interest, a tooth 14, while holding the wand 12 in one hand. Furthermore, the dentist does not need to change lenses to change the focal distance of the wand because the present invention focuses from about 5 mm to infinity via the focusing means. The preferred embodiment has a shallow focal depth which allows a particular aspect of a 3-dimensional object to be focused upon.

The present invention has a variety of uses beyond intra-oral uses. The present invention can be used by the visually impaired for viewing a variety of objects, including, but not limited to typeface, in an enlarged manner on a video screen. The present invention can operate as a full focal range viewing device. Its unique light gathering capability coupled with its small wand size enable the present invention to operate like a miniature camcorder in confined spaces using only ambient light.

The present invention has a variety of industrial uses which include, but not limited to, viewing in and around mechanical apparatus, viewing within pipes and duct work, quality control, and repair work. The present invention can also be used by veterinarians, general medical practitioners and medical specialists in a variety of applications. The present invention further enables a physician better to describe and explain a diagnosis and prognosis to a patient.

As clearly seen, the present invention has numerous uses. One of ordinary skill would be able to understand and appreciate that changes may be made to the disclosed embodiments without departing from the principle and spirit of the invention, the scope of which is defined in the appended claims.

What is claimed is:

1. An electronic optical viewing wand having a distal and proximal end comprising:

a stationary casing having a general tubular shape with a proximal and a distal end;

a focusing casing having a general tubular shape which is concentric with said stationary casing and slidably mounted on said stationary casing, said focusing casing being longitudinally movable in a direction parallel with a stationary casing longitudinal axis;

means for sensing light and producing an electric signal, mounted inside said stationary casing, and having a light receiving portion facing said distal end of said stationary casing; and lens means having a distal and proximal end for refracting light, mounted on said focusing casing, comprising a pinhole lens at the distal end of said lens means, said lens means being capable of receiving an image reflected from an object of interest and, in a cooperative relationship with said slidably mounted focusing casing, focusing said image on said light receiving portion.

2. The viewing wand of claim 1, wherein said focusing casing further comprises a longitudinal slot of predetermined length, and said stationary casing further comprises a movement guide, said slot and said movement guide are in a cooperative relationship that controls said longitudinal movement of said focusing casing with respect to said stationary casing.

3. The viewing wand of claim 1, wherein said optical viewing wand can be held in a user's hand and said focusing casing can be moved in said longitudinal direction with said user's hand.

4. The viewing wand of claim 1, wherein said wand operates in an intra-oral environment using ambient light.

5. The viewing wand of claim 1, wherein said wand can focus on objects located greater than about 5 mm away.

6. The viewing wand of claim 1, further comprising a distal casing removably attached to said distal end of said focusing casing, said distal casing having a light receiving end for directing an image toward said lens means.

7. The viewing wand of claim 6, wherein said distal casing comprises a prism for receiving an image from a radial position relevant to said stationary casing longitudinal axis.

8. The viewing wand of claim 1, further comprising a cable connected to said means for sensing and extending out of a proximal end of said stationary casing for carrying said electric signal.

9. The viewing wand of claim 1, wherein said focusing casing includes a means for gripping that increases a user's ability to grip said wand and slide said focusing casing.

10. The viewing wand of claim 1, wherein said means for receiving light is a charged coupled device.

11. A hand held viewing camera having a focusing system, comprising:

an outer casing having an elongated shape and a hollow interior;

a plurality of lenses mounted at a first end of said outer casing, including a pinhole lens located at a distal portion of said plurality of lenses;

an inner casing having an elongated shape and having a hollow interior, said inner casing being slidably telescopable for a predetermined longitudinal distance within a second end of said outer casing; and a light sensor mounted within said interior of said inner casing and positioned to receive an image refracted through said plurality of lenses, said outer casing and said inner casing slidably telescoping in a linear-longitudinal fashion relative to each other for the purpose of changing a distance between said plurality of lenses and said light sensor.

12. The camera of claim 11, wherein said outer casing includes a longitudinal slot of predetermined length, and said inner casing includes a knob, said slot and said knob are in a cooperative relationship to control the linear-longitudinal telescoping of said outer casing and said inner casing with respect to each other.

13. The camera of claim 11, further comprising a distal casing removably attached to said first end of said outer casing, comprising a light receiving end for receiving and directing an image of an object toward said pinhole lens.

14. The camera of claim 13, wherein said light receiving end is angled to receive said image from a position radial from a longitudinal axis of said outer casing.

15. The camera of claim 14, wherein said light receiving end includes a prism.

16. The camera of claim 11, further comprising an aperture for controlling the light gathering ability of said plurality of lenses.

17. The camera of claim 11, wherein said camera can be held in a user's hand and said inner casing can be slidably telescoped with said hand.

18. The camera of claim 11, wherein said camera is operable in an intraoral environment with ambient light.

19. The camera of claim 11, wherein said light sensor is a CCD.

20. An optical device for viewing an intraoral object illuminated by ambient light and providing an output signal representing an image of said object, comprising:

a body having a generally tubular shape;

an optical means positioned at a first end of said body for refracting said image received by said optical means into a refracted image;

a sensor means positioned at a second end of said body for sensing said refracted image and converting said refracted image into an output signal; and a focusing means, acting in a cooperative relationship with said optical means and said sensor means, for focusing said refracted image into a focused image to be sensed by said sensor means by changing the distance between said optical means and said sensor means, said focusing means being operable from the outside of said body.

21. The optical device of claim 20, wherein said focusing means comprises:

an inner sheath;

an outer sheath slidably connected in a linear telescoping manner to said inner sheath;

a first stopping means for stopping movement of said focusing means at a first predetermined position; and a second stopping means for stopping movement of said focusing means at a second predetermined position.

22. The optical device of claim 20, wherein said device is designed to be held and focused in one of a user's hands.

23. The optical device of claim 20, further comprising a distal casing removably attached to a distal end of said body, said distal casing having a light receiving end for receiving and directing an image toward said optical means.

24. The optical device of claim 23, wherein the distal casing comprises a prism for receiving an image from a radial location with respect to a longitudinal axis of said body.

25. The optical device of claim 20, wherein said optical device can focus on objects greater than 5 mm from a distal end of said optical device.

* * * * *